United States Patent
Kim et al.

(10) Patent No.: US 8,067,475 B2
(45) Date of Patent: Nov. 29, 2011

(54) ADHESIVE SHEET COMPRISING HOLLOW PARTS AND METHOD FOR PREPARING THE SAME

(75) Inventors: Jang Soon Kim, Daejeon Metropolitan (KR); Woo Ha Kim, Donghae-si (KR); Jae Gwan Lee, Daejeon Metropolitan (KR); Suk Ky Chang, Daejeon Metropolitan (KR); Wook Kim, Seoul (KR); Geun Hee Lee, Cheongju-si (KR); Byoung Soo Lee, Seoul (KR); Byeong Gyu Cho, Pocheon-si (KR); Seung Min Yoo, Cheongju-si (KR)

(73) Assignee: LG Chem, Ltd., Seoul (KR)

( * ) Notice: Subject to any disclaimer, the term of this patent is extended or adjusted under 35 U.S.C. 154(b) by 596 days.

(21) Appl. No.: 11/149,272

(22) Filed: Jun. 10, 2005

(65) Prior Publication Data
US 2005/0276963 A1    Dec. 15, 2005

(30) Foreign Application Priority Data
Jun. 11, 2004  (KR) .................. 10-2004-0042922

(51) Int. Cl.
  *C09J 133/08*  (2006.01)
  *C09J 7/00*    (2006.01)
(52) U.S. Cl. ......... 521/76; 521/149; 521/189; 428/40.2; 428/41.5; 428/355 R; 428/356
(58) Field of Classification Search ............ 521/76, 521/149, 189; 428/40.2, 41.5, 355 R, 356
See application file for complete search history.

(56) References Cited

U.S. PATENT DOCUMENTS

| | | | |
|---|---|---|---|
| 4,855,170 A | 8/1989 | Darvell et al. | |
| 6,459,878 B1 | 10/2002 | Tomoyuki et al. | |
| 2001/0055678 A1* | 12/2001 | Murata et al. | 428/346 |
| 2004/0058116 A1* | 3/2004 | Sano et al. | 428/40.1 |

FOREIGN PATENT DOCUMENTS

| | | |
|---|---|---|
| CN | 1323865 | 11/2001 |
| CN | 1493249 | 5/2004 |
| EP | 0 257 984 | 3/1988 |
| JP | 55-090525 | 7/1980 |
| JP | 56-061469 | 5/1981 |
| JP | 63-225684 | 9/1988 |
| JP | 03-268345 | 11/1991 |
| JP | 8-032435 | 3/1996 |
| JP | 2698881 | 9/1997 |
| JP | 10316953 | 12/1998 |
| JP | 11269438 | 10/1999 |
| JP | 11-322999 | 11/1999 |
| JP | 2000-211055 | 8/2000 |
| JP | 2001-047762 | 2/2001 |
| JP | 2001-279196 | 10/2001 |
| JP | 2002-080817 | 3/2002 |
| JP | 2002-148988 | 5/2002 |
| JP | 2002-294192 | 10/2002 |
| JP | 3418430 | 4/2003 |
| KR | 10-1988-0002964 | 5/1988 |
| KR | 1020030092759 A | 12/2003 |
| WO | WO 99/03943 | 1/1999 |

OTHER PUBLICATIONS

Expancel Microspheres, Azko-Nobel, Nov. 2008.*

* cited by examiner

*Primary Examiner* — Irina S Zemel
(74) *Attorney, Agent, or Firm* — McKenna Long & Aldridge LLP

(57) ABSTRACT

Disclosed herein are an adhesive sheet comprising a cured acrylic polymer, hollow polymeric microspheres dispersed and ruptured in the cured acrylic polymer, and hollow parts formed by rupturing the hollow polymeric microspheres dispersed in the cured acrylic polymer, and a preparation method thereof.

13 Claims, No Drawings

ADHESIVE SHEET COMPRISING HOLLOW PARTS AND METHOD FOR PREPARING THE SAME

CROSS-REFERENCE TO RELATED APPLICATIONS

This application claims the benefit of Korean Patent Application No. 10-2004-0042922, filed Jun. 11, 2004 in Korea, which is hereby incorporated by reference in its entirety.

TECHNICAL FIELD

The present invention relates to an adhesive sheet and preparation methods therefor. More particularly, the present invention relates to an adhesive sheet comprising hollow parts formed by rupturing hollow microspheres in cured resins, and preparation methods thereof

BACKGROUND ART

With recent great progress in the electrical and electronic industries, adhesion of electronic parts has become important. Also, thermally conductive adhesives are prepared by thermally dispersing conductive inorganic particles in a polymeric resin in order to control the heat generated by electronic parts. Thermally conductive adhesives function to transfer the heat generated from electronic parts to a heat sink for discharging heat, and to bond electronics parts.

Typically, thermally conductive adhesives for use in removing the heat generated from electronic parts are prepared by adding a thermally conductive filler, such as metal, ceramic, etc., in a resin, such as acrylate, polyurethane or silicone. Recently, higher thermal conductivity has been required in thermally conductive adhesives. Thus, various methods for improving thermal conductivity are being taken, including, for example, development of highly thermally conductive fillers, combination of fillers different in morphology and properties, use of fabric fillers such as non-woven fabric for providing a path for heat conduction, rearrangement of fillers in the presence of a magnetic field, etc. Improvement of thermal conductivity through the modification of structures of thermal conductivity fillers, however, entails a difficulty in hardness control of adhesives and an increase in production cost as well as the necessity of improving the bonding area at irregular/projecting areas. Separate from the development or structure modification of thermally conductive fillers, increasing the bonding area by improving the properties of resin itself is also being studied intensively in order to improve the efficiency of heat transfer.

If there are irregular loci between electronic heating parts and thermally conductive compositions or between heat dissipating members and thermally conductive composition, a visible air layer which is concerned with bonding area having significantly bad influence on heat transfer performance is found therebetween.

To overcome this obstacle, various methods have been suggested, including softening heat dissipating pads to reduce their hardness, embossing the surface of the adhesive sheet used, softening the adhesive sheet, etc.

One of the methods of softening adhesive sheets is to take advantage of foams so as to reduce their hardness. Because they reduce noise and vibration as well as soften resin compositions, the introduction of foams has extensively been studied.

WO99/03943 discloses a double-sided adhesive tape having hollow polymeric microspheres dispersed in a crosslinked adhesive sheet. The dispersed hollow polymeric microspheres can endow the adhesive tapes with restorative power upon compression, but increase the hardness of the adhesive sheet, which offsets the reduction of hardness due to the foam.

Japanese Pat. Laid-Open Publication No. 63-225684 describes a method of simultaneously introducing a crosslinking structure and a foam structure into an acrylic polymer by using UV light radiation in the presence of a diazonium salt compound. However, this method requires that the materials be designed not to interrupt the permeation of UV light. Also, it is difficult to control the size and distribution of foam cells.

A thermal treatment method, which avoids the problem of UV permeation, is disclosed in Japanese Pat. Laid-Open Publication No. 55-90525 which describes a pressure-sensitive adhesive foaming composition, which is thermally crosslinked and foamed. The compounds used for this method are poor in cohesion therebetween and in processability because they have low molecular weights. This method also has difficulty in controlling the size and distribution of foam cells, so that the adhesive composition does not show consistent properties whenever it is prepared.

In order to overcome the problems entailed by the use of low molecular weight compounds, Japanese Pat. Laid-Open Publication No. 2002-80817 suggests thermal curing and foaming treatment of acrylic copolymers having a high molecular weight of 100,000 or more to prepare crosslinked foamed adhesives. The simultaneous execution of thermal curing and thermal foaming according to the prior art cause the size and distribution of foam cells to vary with temperature so as to result in poor uniformity of the properties of the final product. Particularly, the adhesive sheet has non-homogeneous surfaces, which reduce the expansion of the bonding area.

Korean Pat. Laid-Open Publication No. 2003-0092759 describes a UV-cuing foaming resin composition comprising photopolymerizable urethane acrylate oligomers, acetal-based compounds, a photo-decomposable foaming agent, such as sulonium salts or azo-based compounds, and a photocatalyst. Although undergoing chemical foaming in the presence of UV light, it is very difficult to control the size and distribution of foam cells and to set working conditions. The UV photolysis of the photoinitiator produces too many radicals, which makes the resin in a low molecular weight structure, deteriorating cohesive properties of the adhesive. In addition, when the products of this method are used for a long period of time at high temperatures, the nitrogen gas, which is trapped in the resulting foam cells, may leak, exerting a bad influence on the long-term reliability of the adhesive.

Korean Pat. Laid-Open Publication No. 1988-0002964 discloses a foamed pressure-sensitive adhesive sheet with thermoplastic hollow polymeric microspheres having a very low density dispersed therein. The hollow microspheres in the adhesive sheet hinder the increase in the bonding area of the adhesive sheet with regard to glass or metal substrates due to their elasticity. Further, when used for a long period of time at high temperatures, the microspheres expand, which separates the adhesive from the substrate.

DISCLOSURE

The present inventors found that an adhesive sheet comprising hollow parts can be prepared by curing an acrylic polymer comprising hollow microspheres dispersed therein and then rupturing the hollow microspheres. Also, this preparation technique has an advantage over conventional techniques in terms of controlling the size and distribution of foam cells. Also, the adhesive sheet of the present invention is found to change slightly in physical properties with thickness and be able to reduce noise and vibration thanks to the presence of hollow parts therein. Unlike the conventional adhesive sheets in which hollow microspheres remain intact, the adhesive sheets of the present invention enjoy the advantages of having significantly improved flexibility, bonding area, adhesive force, and durability at high temperatures.

Accordingly, it is an object of the present invention to provide an adhesive sheet comprising hollow parts, and preparation methods thereof.

In order to accomplish the above object, the present invention provides an adhesive sheet, comprising: a cured acrylic polymer; hollow polymeric microspheres dispersed and ruptured in the cured acrylic polymer, and hollow parts formed by rupturing the hollow polymeric microspheres dispersed in the cured acrylic polymer.

Also, the present invention provides a method for preparing an adhesive sheet, comprising the steps of a) dispersing hollow polymeric microspheres in an acrylic polymer by mixing the hollow polymeric microspheres and the acrylic polymer;

b) coating the composition obtained by step a) on one or both sides of a substrate;

c) curing the composition coated on the substrate of step b); and d) rupturing the hollow polymeric microspheres dispersed in the cured composition of step c).

A detailed description of the present invention is provided below.

In the present invention, in order to impart softness to adhesive sheets, hollow polymeric microspheres are dispersed in acrylic polymers, the acrylic polymers are cured, and then the microspheres are ruptured. Upon the rupture of the hollow polymeric microspheres dispersed in the cured acrylic polymers, the gas trapped in the hollow microspheres moves to the surface of the adhesive sheets and is released to the air, so that the cured acrylic polymer has hollow parts formed at the positions occupied by the hollow microspheres. The hollow parts may retain the shapes of the hollow microspheres before rupture, or may have somewhat modified shapes.

Conventional adhesive sheets retaining unruptured hollow microspheres are excellent in resiliency, but do not have increased bonding area due to their increased hardness. Thanks to the hollow parts, however, the adhesive sheets prepared in accordance with the present invention can not only perform noise reduction and anti-vibration, but also have higher softness and lower hardness than do conventional adhesive sheets in which hollow microspheres remain unruptured. Thus, the adhesive sheets of the present invention can be readily applied to irregular/projecting or hard surfaces of substrates. In addition, the increase of bonding area to substrates results in an improvement in adhesive force and in thermal conductivity if the adhesive sheets contain thermally conductive fillers.

In the preparation of the adhesive sheets of the present invention, it is very important to uniformly disperse hollow microspheres in cured acrylic polymers so as not to influence the physical properties of interest of the adhesive sheets, such as thermal conductivity, such that the hollow parts are homogeneously disposed in the adhesive sheets after the rupture of the hollow microspheres. When the hollow microspheres are not uniformly dispersed, but are localized in the thickness direction or collect on the surface, the resulting hollow parts are not dispersed throughout the adhesive sheets, which thus cannot realize desired effects. In addition, the physical properties of the adhesive sheet vary with the distribution of the hollow parts.

In the present invention, the rupture of the hollow polymeric microspheres distributed throughout the cured acrylic polymer is not restricted to particular methods. For example, heating, pressing, or microwaving may be employed.

Upon heating, the temperature and time must be sufficient to rupture the hollow microspheres dispersed in the cured acrylic polymer. However, the heat treatment must be conducted so as not to influence the properties of the adhesive sheet. In detail, a cured adhesive composition may be thermally treated at 100-250° C. for 10 sec to 30 min to rupture hollow polymeric microspheres to form hollow parts. If heat treatment is conducted for too short a time, only a portion of the hollow polymeric microspheres are ruptured, so that the resulting adhesive sheet is not sufficiently softened, and thus, the bonding area thereof is not sufficiently increased. On the other hand, too long a heat treatment time deteriorates the base polymer.

In the present invention, the acrylic polymers may be polymerized by various techniques well known in the art, including radical polymerization, solution polymerization, emulsion polymerization, suspension polymerization, photopolymerization, bulk polymerization, etc. A preferred example is as follows: monomers in bulk are partially polymerized by using light or heat to form syrup having a viscosity of 1,000-10,000 cps.

An adhesive sheet according to the present invention can be prepared by homogeneously dispersing hollow polymeric microspheres and, optionally, additives such as thermally conductive fillers in the bulk-polymerized syrup having a viscosity of 1,000-10,000 cps, coating the resulting composition over a substrate such as a polyethylene terephthalate (PET) film, polymerizing and curing the composition through UV irradiation and heat treatment, and rupturing the hollow microspheres. It is preferred that the adhesive composition undergo a degassing process under reduced pressure before being coated on substrates.

The thickness of the adhesive sheet according to the present invention is not limited, but preferably falls in the range from 50 µm to 2 mm. For example, when the thickness of the adhesive sheet is below 50 µm, the stress of the adhesive sheet is not easily relaxed, so that two substrates adhered to both sides of the adhesive sheet and being different in thermal expansion from each other, are likely to be damaged, and the adhesive sheet has a decreased bonding area. In addition, when the adhesive sheet is thicker than 2 mm, the adhesive sheet has large thermal resistance and requires, if imparted with thermal conductivity, a long time period for heat dissipation.

The adhesive sheet of the present invention may be used as a one-sided adhesive tape or a double-sided adhesive tape. The adhesive sheet of the present invention may be prepared using a release film as a substrate. Upon application to electronic equipments, etc., the release film is removed from the adhesive sheet. The adhesive sheet of the present invention can include metal, such as aluminum, copper, stainless steel, and glass as a substrate. When designed to perform thermal conduction, the adhesive sheet of the present invention may be directly applied to a substrate such as a heat sink, or may be provided as an element for an electronic part.

The adhesive sheet of the present invention can be prepared by coating the adhesive composition on one or both sides of a thermally conductive thin film, curing the adhesive composition and rupturing the hollow microspheres. Being backed by or impregnating thermally conductive thin film, the adhesive sheet shows excellent heat transfer uniformity and thermal conductivity in the lateral direction. Thermally conductive thin film may be made from aluminum, copper, stainless steel, glass or thermally conductive non-woven fabric, and its thickness is preferably in the range of 1 to 1000 μm. For example, if thermally conductive thin film is thinner than 1 μm, only an insignificant improvement of thermal conductivity may be obtained. On the other hand, if thermally conductive thin film is thicker than 1000 μm, the adhesive sheet becomes too heavy and has a decreased bonding area. The adhesive sheet comprising a thermally conductive thin film may be obtained by applying the adhesive sheet of the present invention to one or both sides of a thermally conductive thin film.

With respect to the adhesive sheet comprising a thermally conductive thin film, it may have an adhesive layer containing hollow parts formed by the rupture of hollow microspheres on one side and a non-foaming adhesive layer containing no hollow parts on the other side. The non-foaming adhesive layer is preferably 10 to 100 μm in thickness. If the non-foaming adhesive layer has a thickness less than 10 μm, the bonding area is decreased. On the other hand, a thickness greater than 100 μm decreases heat transfer efficiency.

The acrylic polymer used in the present invention is not particularly limited, but may be any one that can be used in conventional adhesives. Suitable is, for instance, a copolymer in which (meth)acrylic acid ester monomers, containing an alkyl group of C1-12, are polymerized with polar monomers. Concrete examples of the (meth)acrylic acid ester monomers include butyl(meth)acrylate, hexyl(meth)acrylate, n-octyl (meth)acrylate, isooctyl (meth)acrylate, 2-ethylhexyl(meth) acrylate, and isononyl(meth)acrylate, etc. Concrete examples of the polar monomers polymerizable with (meth)acrylic acid ester monomer include carboxyl-containing monomers, such as (meth)acrylic acid, maleic acid, fumaric acid, etc., hydroxy-containing monomers, such as hydroxy(meth)acrylate, hydroxy(metha)methylacrylate, etc., and N-containing monomers, such as acryl amide, N-vinyl pyrrolidone, N-vinyl caprolactam, etc. Such a polar monomer serves to impart cohesion to the adhesive and improve the adhesion of the adhesive. The ratio between the (meth)acrylic acid ester monomer and the polar monomer may be any value, but it is preferred that the polar monomer be used in the amount of 1 to 20 weight parts per 100 weight parts of the (meth)acrylic acid ester monomer.

In the present invention, the hollow polymeric microspheres mean spherical polymer shells encapsulating gases that are found in the gaseous state at room temperature. Suitable for use in the present invention are hollow polymeric microspheres that do not rupture under typical conditions for the production processes of adhesive sheets, for example, coating, thermal curing or photo-curing processes, but rupture due to the increased internal gas pressure or morphological instability of the microspheres under a predetermined condition, for example upon thermal treatment at a predetermined temperature or higher.

No particular limitations are imposed on the gas that is trapped in the microspheres if it is in a gaseous state at room temperature. For instance, hollow polymeric microspheres entrapping nitrogen, carbon dioxide, pentane, butane, etc., are preferable. More preferably, one of pentane or butane, which is relatively large in molecular weight, is trapped in hollow polymeric microspheres. The shells of the hollow polymeric microspheres are not particularly limited if they do not rupture under typical process conditions for adhesive sheets, but can be ruptured under a predetermined condition, for example, by the heat treatment used in the present invention. The shells of the hollow polymeric microspheres are preferably made from acrylic, chloro vinylidenic or styrenic polymer. For the sake of compatibility with the acrylic polymer adhesive composition, an acrylic polymer is more preferable.

Although no particular limitations are imposed on the sizes of the hollow polymeric microspheres, they preferably have particle diameters ranging from 1 to 350 μm. For example, when the diameter is less than 1 μm, the adhesive sheet is not softened to a desired extent. On the other hand, when the diameter is greater than 350 μm, the surface of the adhesive sheet becomes rough upon rupturing the microspheres, and thus has low wettability to the substrates having rough surfaces. In addition, the particle diameter greater than 350 μm causes the adhesive sheet to have low thermal conductivity. Preferably, two or more kinds of hollow polymeric microspheres, which differ in size from one another, are combined. When hollow polymeric microspheres with different diameters are mixed, particles of small sizes are present between particles of large sizes, which further improves the softness of the adhesive sheet.

The shells of the hollow polymeric microspheres preferably have a thickness of 0.01-1 μm. For example, a thickness less than 0.01 μm causes the hollow polymeric microspheres to rupture too readily. On the other hand, when the shells are thicker than 1 μm, not only is it difficult to set a condition for rupturing the hollow polymeric microspheres, but also a heat treatment, if employed, is conducted at higher temperatures for a prolonged time period to deteriorate the cured acrylic polymer, thus decreasing the durability of the adhesive sheet.

Although not particularly limited, the density of the hollow polymeric microspheres is preferably in the range from 0.01 to 0.5 $g/cm^3$. For example, when they are transferred and incorporated with the polymer resin, hollow polymeric microspheres having a density less than 0.01 $g/cm^3$ are difficult to weigh exactly because they readily fly away. On the other hand, a density greater than 0.5 $g/cm^3$ leads to an increase in the density of the adhesive sheet.

On the basis of 100 weight parts of the acrylic polymer, hollow microspheres are preferably used in the amount from 0.1 to 10 weight parts and more preferably in an amount from 0.5 to 2 weight parts. When the content of hollow microspheres amount is less than 0.1 weight parts, a desired foaming effect cannot be realized. On the other hand, a content greater than 10 weight parts increases the viscosity of adhesive slurry before curing so as to decrease the processability of the adhesive slurry.

Optionally, the adhesive sheet according to the present invention may contain a thermally conductive filler. Thermally conductive fillers suitable for use in the present invention may include powders of metal oxides, metal hydroxides, metal nitrides, metal carbides, metal borides, metal, etc. Particularly, metal hydroxides can impart flame retardancy to the adhesive sheet in addition to serving as a thermally conductive filler. The amount of thermally conductive filler preferably falls into the range of 50 to 200 weight parts based on 100 weight parts of the acrylic polymer. For example, if the content of thermally conductive filler is less than 50 weight parts, low thermal conductivity results. On the other hand, if the content is greater than 200 weight parts, the hardness of the adhesive sheet increases, which decreases the bonding area Thermally conductive fillers having a particle diameter from 1 to 200 μm are preferable. Thermally conductive fillers having a diameter less than 1 μm increase the viscosity of the adhesive slurry before curing. On the other hand, thermally conductive fillers having a diameter greater than 200 μm improve thermal conductivity, but cause the precipitation of the particles during the curing processes.

Also, the adhesive composition according to the present invention may be cured using light. In this case, a photoinitiator is added to the adhesive composition. The photoinitiator plays a role in controlling the degree of polymerization of the adhesive composition. Examples of suitable photoinitiators include 2,4,6-trimethylbenzoyldiphenylphosphine oxide, bis(2,4,6-trimethylbenzoyl)phenylphosphine oxide, α,α-methoxy-α-hydroxyacetophenone, 2-benzoyl-2(dimethylamino)-1-[4-(4-morphonyl)phenyl]-1-butanone, 2,2-dimethoxy-2-phenylacetophonen, etc., but are not limited thereto. The photoinitiator is preferably used in the amount of 0.01-2 weight parts based on 100 weight parts of the acrylic polymer. For example if the photoinitiator is used in an amount less than 0.01 weight parts, a significant amount of monomers remains unreacted, causing environmental problems. On the other hand, if the content of the photoinitiator is more than 2 weight parts, a large amount of compounds having a low molecular weight is produced in the polymer structure, deteriorating thermal resistance of the adhesive.

The adhesive composition of the present invention, if necessary, may include a photocrosslinking agent. With the photocrosslinking agent, the adhesive properties of the adhesive composition can be controlled. Photocrosslinking agents suitable for use in the present invention include multifunctional acrylates. In detail, examples of the crosslinking agent may include 1,6-hexandiol diacrylate, trimethylolpropane triacrylate, pentaerythritol triacrylate, 1,2-ethylene glycol diacrylate, 1,12-dodecanediol acrylate, etc., but are not limited thereto. Based on 100 weight parts of the acrylic polymer, the crosslinking agent is preferably used in the amount of 0.05 to 2 weight parts. When the content of the crosslinking agent is less than 0.05 weight parts, the adhesive sheet is too soft to have desired thermal resistance. On the other hand, when the content is greater than 2 weight parts, the adhesive sheet becomes so hard as to decrease the bonding area.

Also, the adhesive sheet of the present invention may further comprise additives such as a thermal initiator, a thermal crosslinking agent, a pigment, an antioxidant, a UV stabilizer, a dispersing agent, a defoaming agent, a thickener, a plasticizer, a viscosity modifying agent, a silane coupling agent, a glossing agent, etc. as long as they do not have a bad influence on the effect of the present invention.

MODE FOR INVENTION

A better understanding of the present invention may be obtained through the following examples which are set forth to illustrate, but are not to be construed as the limit of the present invention.

EXAMPLES

Example 1

95 weight parts of 2-ethylhexyl acrylate and 5 weight parts of acrylic acid as a polar monomer were thermally polymerized in a 1-L glass reactor to produce an acrylic polymer having a viscosity of 4500 cps. Then, 0.2 weight parts of Igacure-651 (α,α-methoxy-α-hydroxyacetophenone), as a photoinitiator, and 0.35 weight parts of 1,6-hexanediol diacrylate (HDDA), as a crosslinking agent, were added to 100 weight parts of the acrylic polymer, and then followed by thorough mixing. To this mixture, 0.5 weight parts of hollow microspheres having an average particle diameter of 40 μm (Expancel 092 DE 40 d30, Akzo Nobel) and 0.5 weight parts of hollow microspheres having an average diameter of 120 μm (Expancel 092 DET 120 d30, Akzo Nobel) were added, together with 100 weight parts of aluminum hydroxide, as a thermally conductive filler, having an average diameter of 70 μm (H-100, manufactured by Showa Denko), and the composition was stirred until a homogeneous state was achieved.

With the aid of a vacuum pump, the composition was degassed at a reduced pressure and then applied in a thickness of 1 mm on a release polyester film by a knife coating method. After another polyester film was layered on the coating layer to prevent oxygen penetration, the resulting structure was illuminated for 3 min using a black fluorescent lamp to cure the composition. Subsequently, the structure was treated at 200° C. for 90 sec to rupture hollow polymeric microspheres to realize an adhesive sheet.

Example 2

An adhesive sheet was prepared in the same manner as in Example 1, except that the heat treatment was conducted at 200° C. for 180 sec to rupture the hollow polymeric microspheres.

Example 3

The same procedure as in Example 1 was conducted to prepare an adhesive sheet, except that 0.7 weight parts of hollow microspheres having an average particle size of 40 μm (Expancel 092 DE 40 d30, Akzo Nobel) and 0.3 weight parts of hollow microspheres having an average particle size of 120 μm (Expancel 092 DET 120 d30, Akzo Nobel) were used.

Example 4

The same procedure as in Example 1 was conducted to prepare an adhesive sheet, except that 0.3 weight parts of hollow microspheres having an average particle size of 40 μm (Expancel 092 DE 40 d30, Akzo Nobel) and 0.7 weight parts of hollow microspheres having an average particle size of 120 μm (Expancel 092 DET 120 d30, Akzo Nobel) were used.

Example 5

An adhesive sheet was prepared in the same manner as in Example 1, except that the adhesive composition was applied onto both sides of a 50 μm thick Al film, but not onto the release polyester film, in a thickness of 0.5 mm for each side.

Example 6

An adhesive sheet was prepared in the same manner as in Example 5, except for using a Cu thin film instead of an Al thin film.

Example 7

On one side of an Al thin film, a non-foaming layer which did not contain any hollow microspheres and did not undergo a heat treatment to rupture the microspheres was formed in a thickness of 25 μm, while the adhesive sheet of Example 1 was applied to the other side of the Al thin film, so as to yield a multilayer adhesive sheet.

Comparative Example 1

The same procedure as in Example 1 was carried out to prepare an adhesive sheet, except that hollow polymeric microspheres were not added, and the heat treatment for rupturing the hollow microspheres was not conducted.

Comparative Example 2

The same procedure as in Example 1 was carried out to prepare an adhesive sheet, except that the heat treatment for rupturing the hollow polymeric microspheres was not conducted.

Conditions for producing adhesive sheets of the above Examples and Comparative Examples are summarized in Table 1 below.

TABLE 1

| EXAMPLE No. | Microspheres (size μm) 40 | Microspheres (size μm) 120 | Aluminum hydroxide (size 70 μm) | Thermal Conductive Thin film in adhesive sheet | Heating time(sec) at 200° C. |
|---|---|---|---|---|---|
| 1 | 0.5 | 0.5 | 100 | None | 90 |
| 2 | 0.5 | 0.5 | 100 | None | 180 |
| 3 | 0.7 | 0.3 | 100 | None | 90 |
| 4 | 0.3 | 0.7 | 100 | None | 90 |
| 5 | 0.5 | 0.5 | 100 | Al | 90 |
| 6 | 0.5 | 0.5 | 100 | Cu | 90 |
| 7 Foamed | 0.5 | 0.5 | 100 | Al | 90 |
| Non-Foamed | — | — | 100 | — | — |
| C. 1 | — | — | 100 | None | — |
| C. 2 | 0.5 | 0.5 | 100 | None | — |

Assay to Determine Physical Properties of Adhesive Sheet

1. Bonding Area Test

Each of the sheets prepared in the examples was cut to a size of 90 mm×160 mm and the sheet sample was underlaid by an aluminum base and overlaid with a 3 mm thick glass plate, followed by putting two loads, each weighing 200 g, on the glass plate. After 30 sec, the bonding area between the glass plate and the adhesive sheet was photographed with a digital camera and the images were quantitatively analyzed.

2. Adhesive Force Test

The adhesive forces of the adhesive sheets prepared in the examples were measured with regard to an aluminum plate according to JISZ1541. In this regard, the adhesive sheets were applied to aluminum plates and then let to stand for 30 min at room temperature before the adhesive force was measured in a 180 degree direction.

3. Thermal Conductivity Test

Each of the adhesive sheets prepared in the examples was cut to a size of 60 mm×120 mm and the sheet samples were measured for thermal conductivity, using a thermal conductivity meter, such as that manufactured by Kyoto Electronics Manufacturing Co. Ltd, identified as Quick QTM-500.

Results of the assay for properties of the adhesive sheets prepared in Examples and Comparative Examples are provide in Table 2 below.

TABLE 2

| Example Nos. | Bonding Area (%) | Adhesive Force (g/in) | Thermal Conductivity (W/mK) |
|---|---|---|---|
| 1 | 85 | 934 | 0.35 |
| 2 | 83 | 901 | 0.34 |
| 3 | 82 | 955 | 0.36 |
| 4 | 88 | 912 | 0.32 |
| 5 | 83 | 1152 | 0.68 |
| 6 | 84 | 1136 | 0.83 |
| 7 | 80 | 965 | 0.65 |
| C. 1 | 35 | 1012 | 0.41 |
| C. 2 | 40 | 953 | 0.37 |

As seen in Table 2, the adhesive sheets of the present invention were found to possess a high adhesive force, greater than 900 g/in, and a thermal conductivity of over 0.30 W/m·K. Also, the data of Table 2 show that the bonding area between the glass plate and the adhesive sheet is 80% or more of the area of the applied adhesive sheets 30 sec after the application, and then increased to almost 100% of the area of the applied adhesive sheets after 24 hours. Consequently, the adhesive sheets of the present invention are excellent in bonding area, adhesive force, and thermal conductivity. Hence, serving to transfer the heat generated in a heating body to aluminum heat sinks as well as to support the heat sinks, the adhesive sheets of the present invention can be applied to electronic parts requiring high performance with respect to the bonding area, adhesive force and thermal conductivity, such as plasma display panels.

INDUSTRIAL APPLICABILITY

As described hereinbefore, the adhesive sheets of the present invention change slightly in physical properties with thickness and can reduce noise and vibration thanks to the presence of hollow parts therein. Unlike the conventional adhesive sheets in which hollow microspheres remain intact, the adhesive sheets of the present invention enjoy the advantages of having significantly improved flexibility, bonding area, adhesive force, and durability at high temperatures. Additionally, the method of the present invention allows the size and distribution of foam cells to be readily controlled upon the preparation of adhesive sheets. With these advantages, the adhesive sheets of the present invention can be applied to electronic parts such as plasma display panels.

The invention claimed is:

1. An adhesive sheet, comprising:
   a cured acrylic polymer,
   small size dry expanded (DE) microspheres and large size dry expanded (DE) microspheres dispersed and ruptured in the cured acrylic polymer, the small size dry expanded (DE) microspheres having an average particle diameter of about 40 μm and the large size dry expanded (DE) microspheres having an average particle diameter of about 120 μm;
   hollow parts formed by rupturing the dry expanded (DE) microspheres dispersed in the cured acrylic polymer; and
   a thermally conductive filler,
   wherein the small size and large size dry expanded (DE) microspheres, prior to rupturing, range from 0.01 to 0.5 g/cm$^3$ in density and are contained in an amount of 0.1-10 weight parts based on 100 weight parts of the acrylic polymer, and the adhesive sheet has a thermal conductivity of 0.32~0.83 W/mK.

2. The adhesive sheet according to claim 1, wherein each of the small size and large size dry expanded (DE) microspheres, prior to rupturing, has a shell made from a polymer selected from a group consisting of acrylic, chlorovinylidenic and styrenic polymers, said shell having a gas trapped therein, said gas being in a gaseous state at room temperature.

3. The adhesive sheet according to claim 1, wherein the small size and large size dry expanded (DE) microspheres, prior to rupturing, have a shell thickness ranging from 0.01 to 1 μm.

4. The adhesive sheet according to claim 1, wherein thermally conductive filler is contained in an amount of 50 to 200 weight parts based on 100 weight parts of the acrylic polymer.

5. The adhesive sheet according to claim 1, wherein thermally conductive filler is selected from a group consisting of metal oxides, metal hydroxides, metal nitrides, metal carbides, metal borides and metal.

6. The adhesive sheet according to claim 1, wherein thermally conductive filler ranges, in particle size, from 1 to 200 μm.

7. The adhesive sheet according to claim 1, further comprising an additive selected fi-om a group consisting of photoinitiators, photocrosslinking agents, thermal initiators, thermal crosslinking agents, pigments, anti-oxidants, UV-stabilizers, dispersing agents, defoaming agents, thickeners, plasticizers, viscosity modifying agents, silane coupling agents, glossing agents and combinations thereof.

8. The adhesive sheet according to claim 1, wherein the adhesive sheet ranges, in thickness, from 50 μm to 2 mm.

9. The adhesive sheet according to claim 1, further comprising a thermally conductive thin film with one or both sides coated with the adhesive sheet.

10. The adhesive sheet according to claim 9, wherein thermally conductive thin film ranges, in thickness, from 1 to 1000 μm and is made from a material selected from a group consisting of aluminum, copper, stainless steel, glass and thermally conductive non-woven fabric.

11. A method for preparing an adhesive sheet, comprising:
a) dispersing small size dry expanded (DE) microspheres, large size dry expanded (DE) and a thermally conductive filler in an acrylic polymer to obtain a composition by mixing the small size and large size dry expanded (DE) microspheres, the thermally conductive filler and the acrylic polymer, the small size dry expanded (DE) microspheres having an average particle diameter of about 40 μm and the large size dry expanded (DE) microspheres having an average particle diameter of about 120 μm;
b) coating the composition obtained by step a) on one or both sides of a substrate;
c) curing the composition coated on the substrate of step b); and
d) rupturing the small size and large size dry expanded (DE) microspheres dispersed in the cured composition of step c),
wherein the small size and large size dry expanded (DE) microspheres, prior to rupturing, range from 0.01 to 0.5 g/cm$^3$ in density and are contained in an amount of 0.1-10 weight parts based on 100 weight parts of the acrylic polymer, and the adhesive sheet has a thermal conductivity of 0.32~0.83 W/mK.

12. The method according to claim 11, wherein step c) is accomplished by carrying out a heat treatment at 100-250° C. for 10 sec to 30 min.

13. The method according to claim 11, wherein the substrate is a thermally conductive thin film or a release film.

* * * * *